United States Patent [19]

Ishihara et al.

[11] Patent Number: 4,966,797

[45] Date of Patent: Oct. 30, 1990

[54] PROCESS FOR PRODUCING MAGNETIC RECORDING MEDIUM, MAGNETIC PAINT, AND MAGNETIC DISK

[75] Inventors: Heigo Ishihara, Tokyo; Akira Osaki; Takanori Kudo, both of Hachioji, all of Japan

[73] Assignee: Hitachi Ltd., Tokyo, Japan

[21] Appl. No.: 455,241

[22] Filed: Dec. 22, 1989

[30] Foreign Application Priority Data

Dec. 26, 1988 [JP] Japan .................. 63-326375

[51] Int. Cl.$^5$ .............................. H01F 10/02
[52] U.S. Cl. ................... 427/64; 252/62.54;
427/128; 427/130; 427/131; 427/380;
428/308.4; 428/315.7; 428/315.9; 428/316.6;
428/321.1; 428/339; 428/695; 428/900
[58] Field of Search ............ 427/128, 130, 131, 380;
428/308.4, 64, 315.7, 315.9, 316.6, 321.1, 339,
695, 900; 252/62.54

*Primary Examiner*—Bernard Pianalto
*Attorney, Agent, or Firm*—Fay, Sharpe, Beall, Fagan, Minnich & McKee

[57] ABSTRACT

A magnetic recording medium is prepared by applying a magnetic paint containing at least magnetic particles and a thermally curable binder to a substrate, thermally curing the applied magnetic paint, thereby forming a magnetic film, and impregnating micropores formed in the magnetic film with a lubricant, where the magnetic paint further contains a poly(alkyleneoxide)-grafted binder, and the grafted poly(alkyleneoxide) moiety is thermally decomposed during the thermal curing, thereby forming the micropores in the magnetic film. A large number of micropores having a pore size of not more than 0.1 μm are formed in the magnetic film, and a magnetic disk of high durability with less noises and errors during the recording and reproduction can be obtained.

26 Claims, 2 Drawing Sheets

PROCESS FOR PRODUCING MAGNETIC RECORDING MEDIUM, MAGNETIC PAINT, AND MAGNETIC DISK

BACKGROUND OF THE INVENTION

This invention relates to a process for producing a magnetic recording medium, a magnetic paint and a magnetic disk, and particularly to a process for producing a magnetic recording medium having a good wear resistance suitable to applications such as magnetic disks, etc., a magnetic paint, and a magnetic disk.

Generally, in magnetic recording media such as magnetic disks, etc., a magnetic film is formed on various substrates, and the surface of the magnetic film is susceptible to frictions with a magnetic head at a high speed during the recording and reproduction. Deterioration of the properties of magnetic recording media by the frictions is a serious problem.

In order to protect the surface of a magnetic film from damages due to the frictions with a magnetic head, a lubricant has been usually applied to the surface of the magnetic film. It is known that fluorinated oils such as perfluoropolyether, etc. are preferable lubricants for the magnetic recording media, as disclosed in U.S. Pat. No. 3,778,306.

In the application of the lubricant to magnetic recording media such as magnetic disks, etc., the durability of the magnetic recording media is increased with increasing amount of the lubricant, but the sticking force of the magnetic head to the surface of the magnetic recording head is increased during the discontinuation to drive the magnetic recording apparatus when too much lubricant is applied to the surface of the magnetic film, and the magnetic head or the surface of the magnetic recording media is damaged at the start to drive the magnetic recording apparatus or the magnetic recording apparatus cannot be driven. The sticking force between the magnetic head and the magnetic recording medium depends upon the amount of the lubricant existing on the surface of the magnetic recording medium, as mentioned above, and it has been proposed to appropriately control the amount of a lubricant on the surface of a magnetic film by making the magnetic film porous and impregnating the pores of the porous magnetic film with the lubricant. For example, Japanese Patent Application Kokai (Laid-open) No. 53-104202 discloses a method comprising adding nonmagnetic particles to a magnetic film, thereby making the magnetic film porous and impregnating the resulting pores with a lubricant, and Japanese Patent Application Kokai (Laid-open) No. 63-181121 discloses a method comprising adding poly(alkyleneoxide) of good thermal decomposability to a magnetic paint, thermally decomposing the poly(alkyleneoxide) when the coated film is cured, thereby dissipating the decomposition products and making the magnetic film porous, and impregnating the pores of the porous magnetic film with a lubricant.

In the case of magnetic recording media of high recording density, where thinner magnetic films are required, Japanese Patent Application Kokai (Laid-open) No. 63-19325 discloses a method and a structure of impregnating an underlayer with a large amount of a lubricant and supplying the lubricant from the underlayer to the surface of a magnetic film through micropores in the magnetic film (the method will be hereinafter referred to as underlayer impregnation). It is further disclosed that the underlayer impregnation structure can be formed by adding poly(alkyleneoxide) of good thermal decomposability to an underlayer paint, applying the underlayer paint to a substrate as an underlayer, curing the underlayer at such a temperature as not to thermally decompose the poly(alkyleneoxide), then applying a magnetic film to the surface of the underlayer, and heat curing the magnetic film, thereby thermally decomposing the poly(alkyleneoxide) in the underlayer and dissipating the decomposition products at the same time and making the underlayer and the magnetic film porous.

In the foregoing prior art, the method of adding magnetic particles to the magnetic film has such problems as an increase in noise output due to the additive, etc. The method of making the magnetic film porous by thermal decomposition of the organic additive has such problems as formation of larger pores in the magnetic film when an additive having an appropriate compatibility with a binder in the magnetic paint is not properly selected, with the results of generation of noises or errors. Even the method of making the magnetic film porous by thermal decomposition of poly(alkylenoxide) still has such problems that the compatibility of poly(alkyleneoxide) with a binder in the magnetic paint is not satisfactory yet, though the poly(alkylenoxide) is selected in view of the thermal decomposition characteristics and the compatibility with the binder in the magnetic paint, and the procedures for dispersing magnetic particles, magnetic orientation, etc. have an influence on the phase separation, resulting in poor product yield.

Formation of underlayer impregnation structure of the prior art has another problem. In order to make the underlayer porous, it is necessary to add a thermally decomposable additive to the underlayer, as mentioned above. The underlayer is adjusted so that the binder or pigment in the underlayer may not enter the magnetic film by primary curing of the underlayer before the application of the magnetic film. However, since the thermally decomposable additive exists in a free state in the underlayer, it permeates into the magnetid film. When the additive permeates too much, the same effect is obtained at that when a large amount of the thermally decomposable additive is added to the magnetic paint, and the magnetic film becomes more porous than required.

SUMMARY OF THE INVENTION

A first object of the present invention is to provide a process for producing a magnetic recording medium in good yield by providing a magnetic film with fine pores that does not substantially deteriorate the reproduction characteristics of the magnetic recording medium and impregnating the fine pores with a lubricant; a magnetic paint for use in the process; and a magnetic disk.

A second object of the present invention relates to formation of an underlayer impregnation structure in a magnetic recording medium and provide a process for adjusting the porosity of an underlayer and the porosity of a magnetic film independently from each other and the structure in a magnetic recording medium.

The first object of the present invention can be attained by a process for producing a magnetic recording medium which comprises applying a magnetic paint containing at least magnetic particles and a thermally curable binder to a substrate, thermally curing the applied magnetic paint, thereby forming a magnetic film and impregnating micropores in the magnetic film with a lubricant, the magnetic paint containing a binder chemically grafted with poly(alkyleneoxide) by chemical reaction in advance without mere addition of free poly(alkyleneoxide) to the magnetic paint. That is, a magnetic disk with micropores impregnated with a lubricant, as shown in FIG. 1, can be formed by applying the magnetic paint to the substrate and thermally curing the applied magnetic paint, thereby thermally decomposing the grafted poly(alkyleneoxide) moiety to form micropores in the resulting magnetic film, and thus the first object of the present invention can be attained in this manner.

The second object of the present invention can be attained by the following process. That is, an underlayer paint is prepared by adding to the paint a binder grafted with poly(alkyleneoxide) by chemical reaction in advance as a portion of the paint binder in the same manner as in attaining the first object. Then, the underlayer paint is applied to a substrate to form a film, which is thermally cured (primary curing) at such a temperature as not to thermally decompose the grafted poly(alkyleneoxide) moiety. Then, a magnetic paint is applied to the underlayer and both magnetic film and underlayer are thermally cured (secondary curing) to thermally decompose the poly(alkyleneoxide) moiety contained in the underlayer during the thermal curing to dissipate the thermal decomposition products, thereby forming a large number of fine pores in the underlayer and also forming micropores extending from the fine pores to the surface of the magnetic film at the same time. As a result, a magnetic disk with an underlayer impregnated with a lubricant, as shown in FIG. 2, can be obtained, and the second object of the present invention can be attained in this manner.

Addition ratio of poly(alkyleneoxide)-grafted binder and grafting ratio of poly(alkyleneoxide) to be grafted to a binder are adjusted in accordance with the porosity of an underlayer. In order to adjust the porosity of a magnetic film in the foregoing processes, a poly-(alkyleneoxide)-grafted binder or poly(alkyleneoxide) is added to the magnetic paint. In order to adjust the porosity of an underlayer, poly(alkyleneoxide) is added to the underlayer paint. Detail of the processes will be described later.

As the binder, the following well known resins can be used in the present invention, for example, epoxy resin, phenol resin, polyvinyl resin, polyester, cellulose derivatives, melamine resin, polymethane, polyamide, acrylic resin, methacrylic resin, or their copolymers, etc. They can be used alone or in their mixtures. Particularly preferable binder is a mixture of epoxy resin or phenol resin or both as the main component and further containing at least one of other resins such as polyvinyl resin, acrylic resin, methacrylic resin, polyester, polyurethane, etc. A preferable composition of the binder in this case is 10 to 70% by weight, preferably 25 to 62% by weight of epoxy resin, 10 to 70% by weight, preferably 25 to 62% by weight, of phenol resin, and 2 to 30% by weight, preferably 8 to 22% by weight of at least one of vinyl resin, acrylic resin, methacrylic resin, polyester and polyurethane, on the basis of the total weight of the binder.

In the present invention, a poly(alkyleneoxide) grafted binder is used. Such poly(alkyleneoxide) is a polymer having an ether bond and includes, for example, poly(ethyleneoxide), poly(propyleneoxide), poly(-buteneoxide), poly(heptaneoxide) and their copolymers. Among these polymers including copolymers, polymers having a terminal hydroxyl group, such as polyether glycol, polypropylene glycol, polytetramethylene, ether glycol, etc. have a high thermal decomposability than polymer having no ether bond and are oxidized and decomposed in the atmosphere at a temperature of about 180° to about 230° C. Thus, it is preferable to use polymers having a terminal hydroxyl group.

In the case of poly(alkyleneoxide) having at least one terminal alkyl ether in place of the terminal hydroxyl group, decomposition of the poly(alkyleneoxide) moiety is more liable to take place at the terminal, as in the case of poly(alkyleneoxide) having a terminal hydroxyl group.

Poly(alkyleneoxide) having a terminal hydroxyl group can be grafted on a binder by utilizing its reactivity with, for example, an isocyanate group. In the grafting on a binder, it is preferable to graft it on the binder while retaining the terminal hydroxyl group. When this condition is satisfied, the distinguished thermal decomposability of poly(alkyleneoxide) having a terminal hydroxyl group is not lost.

A binder grafted with a poly(alkyleneoxide) having at least one terminal alkylether group without the terminal hydroxyl group can have the same effect as that of the binder grafted with a poly(alkyleneoxide) having a terminal hydroxyl group, as mentioned above. Thus, it is possible to graft a binder with a poly(alkyleneoxide) having a terminal hydroxyl group and at least one of other terminal alkylether groups by utilizing its reactivity with an isocyanate group without loosing the thermal decomposability.

Examples of binders grafted with a poly(alkyleneoxide) are given below, which can be used alone or in combination.

Epoxy resin grafted with poly(alkyleneoxide), phenol resin grafted with poly(alkyleneoxide), polyvinylbutyral grafted with poly(alkyleneoxide), cellulose resin grafted with poly(alkyleneoxide), and urethane resin grafted with poly(alkyleneoxide).

The polyalkyleneoxide-grafted epoxy resin will be explained in detail below. Bisphenol A type epoxy resin represented by the following formula (I) can be used as epoxy resin.

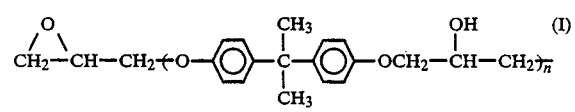

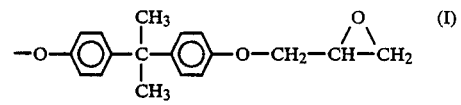

In the case of the resin having a hydroxyl group as shown by formula (I), an isocyanate is added to the hydroxyl group and then allowed to react with a poly-(alkyleneoxide) to make a poly(alkyleneoxide)-grafted resin.

Examples of isocyanate for use in the foregoing reaction are given by the following formulae (A) to (H).

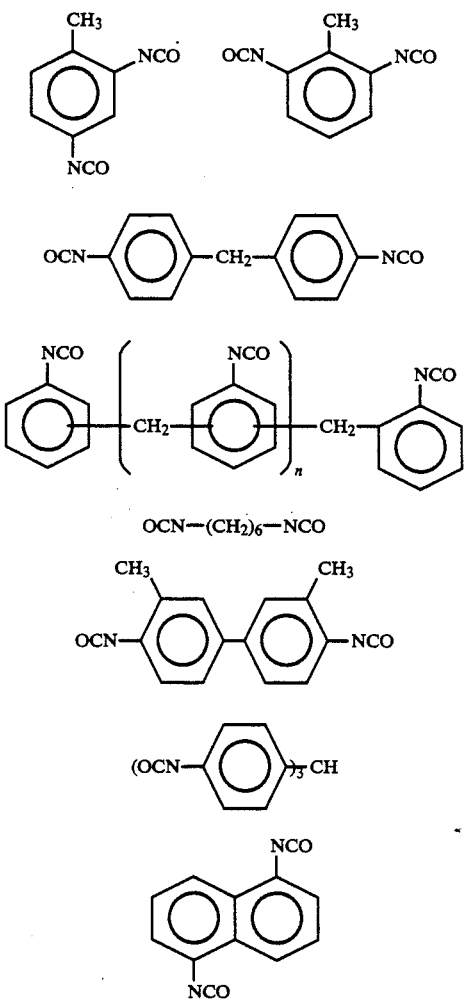

show poly(alkyleneoxide), a portion of whose terminal hydroxyl groups is alkyletherized.

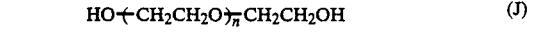  (J)

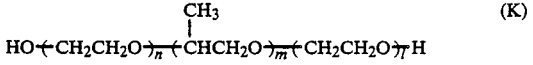  (K)

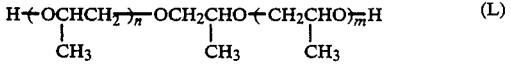  (L)

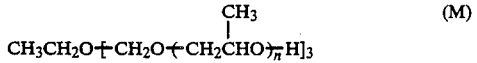  (M)

$$HO \leftarrow CH_2CH_2CH_2CH_2O \rightarrow_{\overline{n}} H \quad (N)$$

$$HO \leftarrow CH_2CH_2O \rightarrow_{\overline{n}} CH_2CH_2OR \quad (O)$$

  (P)

  (Q)

$$HO \leftarrow CH_2CH_2CH_2CH_2O \rightarrow_{\overline{n}} R \quad (R)$$

A first synthesis example of poly(alkyleneoxide)-grafted epoxy resin will be given below.

Epoxy resin of formula (I) is dissolved in a solvent mixture of cellosolve acetate and xylene, and the solution is stirred with a stirrer in a $N_2$ gas atmosphere at 80° C., while adding thereto an isocyanate solution in the same solvent mixture as above, where the amount of isocyanate is less than the equivalent weight of the hydroxyl group on epoxy resin. The mixture is stirred for 2 hours. When the isocyanate is a compound of formula (B), a compound of the following formula (II) can be obtained.

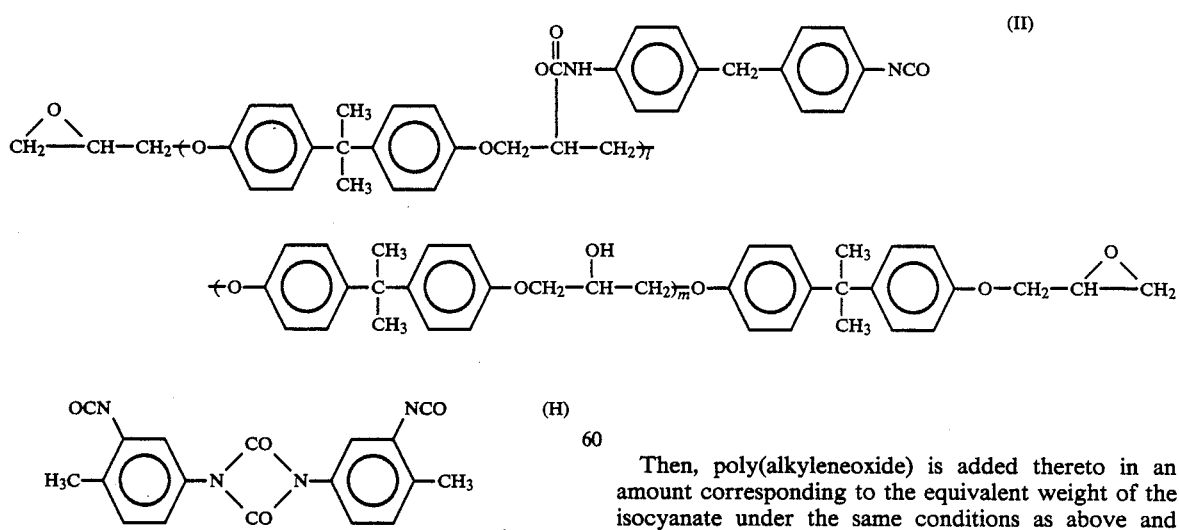

Then, poly(alkyleneoxide) is added thereto in an amount corresponding to the equivalent weight of the isocyanate under the same conditions as above and subjected to reaction for one hour to obtain poly(alkyleneoxide)-grafted epoxy resin.

When polytetramethyleneetherglycol of formula (N) is used as poly(alkyleneoxide), resin of the following formula (III) can be obtained.

Likewise, examples of poly(alkyleneoxide) are given by the following formulae (J) to (N) and (O) to (R). All the formulae (J) to (N) show poly(alkyleneoxide) having a terminal hydroxyl group and the formulae (O) to (R)

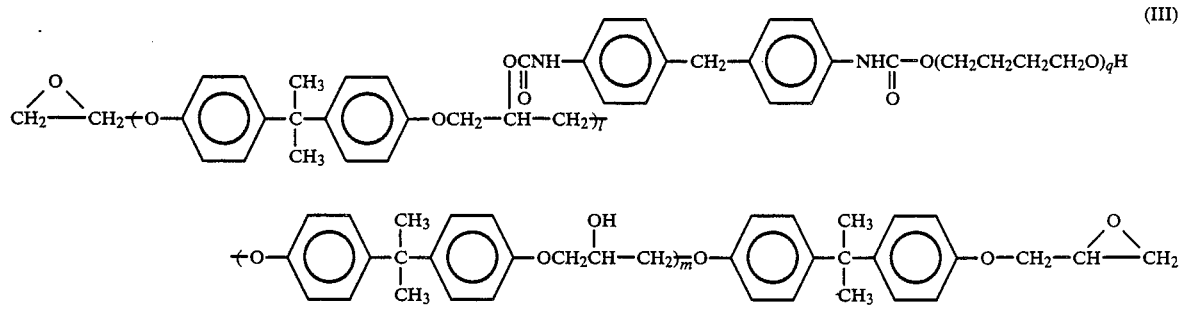

(III)

Poly(alkyleneoxide) grafted epoxy resin can be synthesized in the foregoing procedure, where side reactions take place unless the rate of dropwise addition of isocyanate, stirring conditions, concentration, etc. are thoroughly controlled, and desired pure products are hard to obtain. For example, in the reaction of epoxy resin of formula (I) with diisocyanate a byproduct resulting from reaction of two molecules of epoxy resin with diisocyanate is sometimes obtained. Thus, a second synthesis example, where the foregoing problem is dissolved, will be given below.

As already mentioned above, poly(alkyleneoxide) whose terminal is alkylethesized has the same thermal decomposition characteristics as those of poly(alkyleneoxide) having a terminal hydroxyl group. Thus, the desired products can be synthesized by using poly(alkyleneoxide) having one terminal hydroxyl group and another alkyletherized terminal, as shown by formulae (O) to (R) as raw materials.

For example, when 2,4-toluenediisocyanate of formula (A) is allowed to react with α-(hydro-ω-alkoxypolybuteneoxide of formula (R), the reaction proceeds according to the following reaction equation (IV) owing to a higher reactivity of the isocyanate group at the para position with respect to the methyl group of formula (A), and the following prepolymer can be synthesized.

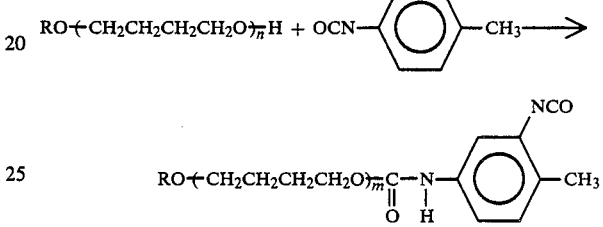

The synthesis reaction is carried out in diglyme as a solvent at 80° C.

Then a solution of epoxy resin of formula (I) in diglyme is stirred in an $N_2$ gas atmosphere at 80° C., while adding thereto a necessary amount of the prepolymer solution, and reaction of the following reaction equation (V) is made to proceed and the desired product poly(alkyleneoxide)-grafted epoxy resin can be obtained.

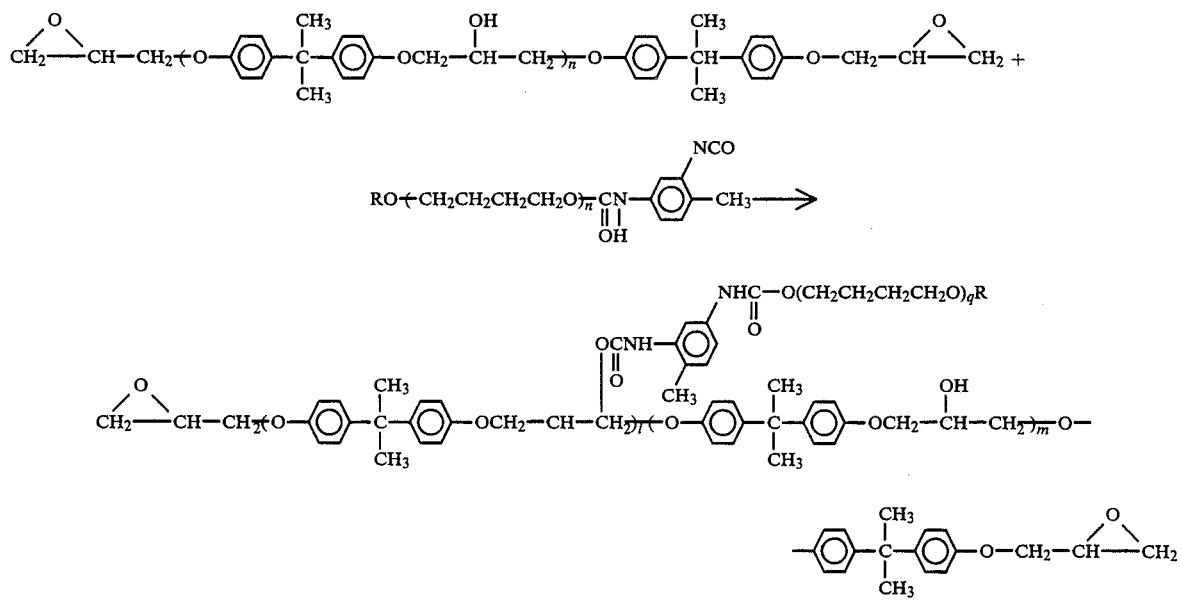

Poly(alkyleneoxide)-grafted phenol resin is exemplified below, referring to polyvinylphenol of formula (IV) as a base, on which isocyanate of formula (A) and poly(alkyleneoxide) of formula (N) are grafted. Resin of the following formula (VI) can be obtained by reactions similar to the foregoing reactions.

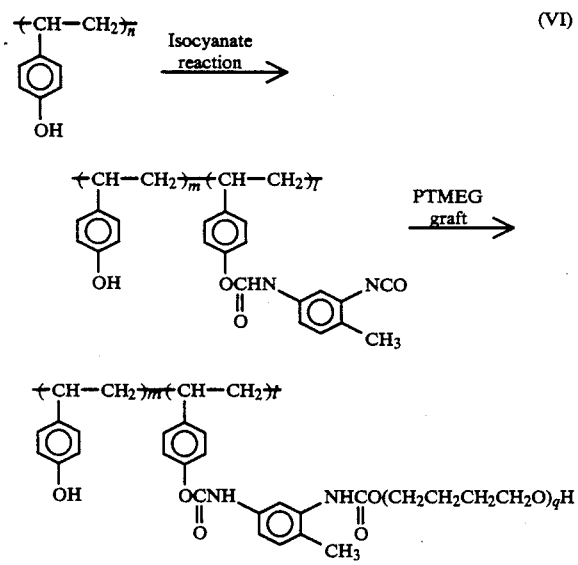

(VI)

In the case of poly(alkyleneoxide)-grafted phenol resin, poly(alkyleneoxide), a portion of whose terminal is alkylenetherized can be grafted on the phenol resin in high yield, as in the case of epoxy resin. For example, when α-(hydro)-ω-(alkyloxy)-poly(buteneoxide) is allowed to react with isophorone diisocyanate, a prepolymer can be synthesized according to the following reaction equation.

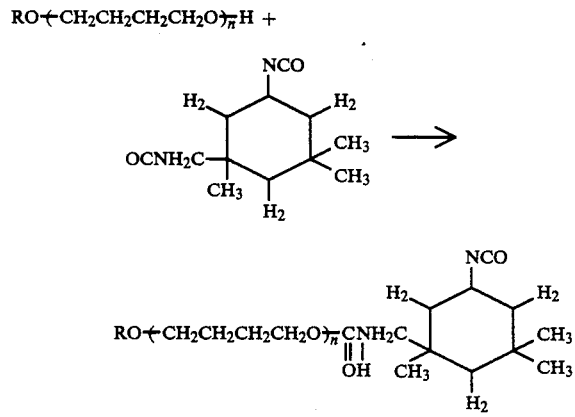

The reaction is carried out in diglyme as a solvent at 90° C.

Then, a solution of phenol resin in diglyme is added to the prepolymer with heating at 80° C. and stirring to proceed with the reaction, whereby the following poly(alkyleneoxide)-grafted phenol resin is obtained.

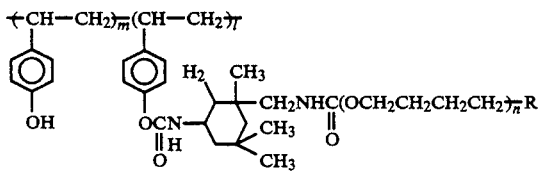

Poly(alkyleneoxide)-grafted polyvinylbutyrol, poly(alkyleneoxide)-grafted cellulose resin, etc. can be also obtained by grafting poly(alkyleneoxide) on the hydroxyl groups of polybutyral, cellulose resin, etc. in the same manner as above.

The binders grafted with poly(alkyleneoxide) for use in the present invention have a good compatibility with other binders.

As already mentioned above, poly(alkyleneoxide) a portion of whose terminals is methyletherized can be used. As is obvious from the explanation of the foregoing principle, not only the alkylether group but also such functional groups as less reactive with the isocyanate group or easily thermally decomposable can be likewise used.

When the amount of poly(alkyleneoxide) moiety in the binder exceeds 30% by weight on the basis of the weight of total binders in the present magnetic paint, noises are increased during the recording and reproduction of a magnetic recording medium and the wear resistance is lowered. The effect of the thermally decomposable additive upon formation of porosity is significant even at 1% by weight and much pronounced at 5% by weight or more. Thus, a preferable amount of poly(alkyleneoxide) moiety in the binder is 1 to 30% by weight, more preferably 5 to 30% by weight, on the basis of the weight of total binders.

In the case of forming the underlayer, a larger amount of poly(alkyleneoxide) can be added than that in the case of the single magnetic film, because the pores in the underlayer have no direct influene upon noises, etc. When the amount of poly(alkyleneoxide) moiety in the binder in the underlayer is not more than 5% by weight, on the basis of the weight of total binders, the amount of a lubricant as impregnated is not satisfactory, and above 60%, the wear resistance of the underlayer is lowered. Thus, a preferable amount of poly(alkyleneoxide) in the binder in the underlayer is 5 to 60% by weight, on the basis of the weight of total binders. The weight of total binders is a sum total of the binder moiety of poly(alkyleneoxide)-grafted binder and poly(alkyleneoxide)-free binder, excluding poly(alkyleneoxide). The weight of poly(alkyleneoxide) is calculated from the weight of poly(alkyleneoxide) before the grafting on the binder. Some molecules are lost from the polymers used as a starting material owing to reactions such as dehydration-condensation, etc. during the grafting, but the weight of lost molecules is very small, as compared with the weight of the starting material polymers, and thus the foregoing calculation holds true even in that case.

In the present invention, free poly(alkyleneoxide) not grafted on the binder can be added to the binder. In that case, the weight of free poly(alkyleneoxide) is preferably approximately equal to or less than 4 times the weight of the poly(alkyleneoxide) grafted on the binder, and more preferably less than the weight of poly(alkyleneoxide) grafted of the binder. Total amount of the grafted poly(alkyleneoxide) moiety and free poly(alkyleneoxide) is preferably in a range of 1 to 30% by weight on the basis of the weight of total binders, as defined before. In the case of forming an underlayer, 5 to 60% by weight is preferable.

The content of magnetic powder in the magnetic film of a magnetic recording medium is preferably 15 to 65% by volume on the basis of the total volume of the magnetic film, and this range corresponds to about 50 to about 90% by weight when, for example, {-Fe₂O₃ (specific gravity: about 5) is used as the magnetic powder. A magnetic film can further contain a reinforcing agent such as alumina, etc., if required. A preferable amount of the reinforcing agent is in a range of 1 to 10% by weight on the basis of sum total of the binders, the magnetic powder and the reinforcing agent.

The structure of a magnetic disk produced by the foregoing process is as follows:

| | |
|---|---|
| Pore size of micropores in the magnetic film: | 0.1 μm or less |
| Total pore area ratio: | 3 to 30%. |

When the pore size exceeds 0.1 μm, noises are generated during the recording and reproduction of the magnetic disk.

When the total pore area ratio is less than 3%, no satisfactory impregnation with a lubricant is obtained and the durability is sometimes deteriorated. On the other hand, when the total pore area ratio exceeds 30%, the magnetic film becomes brittle and the wear resistance is lowered. Thus, the present process for producing a magnetic disk can form micropores with less influences of errors and noises and thus a large number of micropores can be provided in the magnetic film. That is, the micropores can be impregnated with a sufficiently large amount of a lubricant and consequently the durability of the magnetic disk can be surprisingly improved.

In the case of forming a magnetic recording medium with an underlayer according to the present invention, it is preferable to take the following points into consideration.

In order to retain a sufficient amount of a lubricant such as fluorinated oil, etc. for example, perfluoroalkylpolyether, etc. in the underlayer, a larger thickness is more preferable for the underlayer, and it is desirable that the thickness of an underlayer is at least about 0.5 times the thickness of a magnetic film. In order to obtain a flat magnetic film, it is preferable that the thickness of the underlayer is 5 μm or less.

As to the thickness of a magnetic film, a smaller thickness is more preferable for attaining high density magnetic recording. In the present magnetic recording medium, a thickness of 0.1 to 0.8 μm is preferable for the magnetic film.

The surface shape of an underlayer has an influence upon defects, noises, etc. of a magnetic recording medium and thus it is preferable to surface-finish the underlayer after the primary curing, thereby flatening the underlayer surface.

In order to effectively attain the effect of thermally decomposable additive in the underlayer, it is preferable to suppress the shrinkage of the underlayer by curing during the thermal decomposition of the thermally decomposable additive and dissipation of decomposition products, and to this effect it is effective to add non-magnetic particles such as $\alpha$-$Fe_2O_3$, $SiO_2$, $Al_2O_3$, SiC, $ZrO_2$, polymer particles, etc. to the underlayer. The amount of the non-magnetic particles is preferably not more than 65% by volume on the basis of the sum total of the binders and the particles in the underlayer.

In the case of improving the magnetic properties of a magnetic recording medium by giving a lubricant impregnability and a magnetic property to the underlayer at the same time, magnetic particles such as $\{$-$Fe_2O_3$, Fe powder, $\{$-$Fe_2O_3$ containing Co, $Fe_3O_4$, $Fe_3O_4$ containing Co, Ba ferrite, etc. can be added to the underlayer, and the amount of the magnetic particles is preferably not more than 65% by volume on the basis of the sum total of the binders and the particles in the underlayer.

The particle size of the non-magnetic particles is not more than twice the thickness of an underlayer. When the particle size of the non-magnetic particles in the underlayer exceeds twice the thickness of the underlayer, defects are brought about, if the particles are projected from the underlayer into the magnetic film. There is particularly no lower limit thereto, but the particle size of now available fine non-magnetic particles is generally 0.02 μm or more.

The magnetic particles to be added to the underlayer are closely related to the magnetic characteristics of a magnetic recording medium, and thus the particle size of the magnetic particles in the underlayer must be approximately equal to that of the magnetic particles for use in the magnetic film of ordinary magnetic recording media, i.e. 0.5 to 0.02 μm.

At first, the function of the means to attain the first object of the present invention will be explained below.

In the present binder, the grafted poly(alkyleneoxide) is promptly oxidized and decomposed at a temperature of 180° to 230° C., as already described before. The curing temperature of preferable binders mainly used in magnetic disks, etc. is in the above-mentioned temperature range or higher, and thus the grafted poly(alkyleneoxide) can be thermally decomposed and dissipated in the curing step for coating films.

The present poly(alkyleneoxide)-grafted binder is prepared by grafting poly(alkyleneoxide) on a binder for a magnetic recording medium, the binder itself being compatible with other binders, and thus has a good compatibility with other binders in a magnetic film without any considerable phase separation in the magnetic film. Thus, the micropores become too larger or the effect of forming micropores is not deteriorated by spreading of the thermally decomposable additive from the magnetic film in any event.

Besides the poly(alkyleneoxide)-grafted binder, free poly(alkyleneoxide) as not grafted can be added to the magnetic paint, as already mentioned before. It is needless to say that during the thermal curing, the free poly(alkyleneoxide) can be thermally decomposed and dissipated to form micropores as effectively as the grafted poly(alkyleneoxide).

The effect of using the free poly(alkyleneoxide) together with the poly(alkyleneoxide)-grafted binder is that the poly(alkyleneoxide)-grafted binder contained in the binder can enhance the compatibility of free poly(alkyleneoxide) with the binder as in effect of the grafted poly(alkyleneoxide). Thus, finer micropores can be formed without any considerable phase separation of free poly(alkyleneoxide) in the magnetic film.

In the magnetic paint for use in the present process for producing a magnetic recording medium, carefully examined materials with respect to the thermal decomposition characteristics, compatibility, etc. are used. With such a magnetic paint, a magnetic film is formed, and by heat treatment at an appropriate temperature, a large number of micropores are formed and a curing state with a good wear resistance is obtained. A magnetic film impregnated with a large amount of a lubricant can be obtained in high yield. Thus, a magnetic recording medium of high durability with less noises during the recording and reproduction of the magnetic recording medium can be obtained in the present invention.

Then, the function of the means to attain the second object of the present invention will be explained below.

Also in the case of forming an underlayer, the same effect can be obtained as in the case of forming the magnetic film. The problem peculiar to formation of a magnetic film on the underlayer, that is, such a problem that the thermally decomposable additive permeates into the magnetic film from the underlayer during the formation of the magnetic film, resulting in failure to control the porosity of the magnetic film can be solved, as already described before. The function will be explained in detail below.

When a polyalkyleneoxide-grafted binder is used as a thermally decomposable additive in the underlayer, the polyalkyleneoxide-grafted additive reacts with other binders during the primary curing of the underlayer and fixed in the underlayer, quite different from the case of using free poly(alkyleneoxide). Thus, there takes place no permeation into the magnetic film formed on the surface of the underlayer, and thus the porosity of the magnetic film can be controlled, independently from the underlayer. However, the aforementioned formation procedure never excludes use of free thermally decomposable additive, such as poly(alkyleneoxide). When free poly(alkyleneoxide) is used in the formation of an underlayer, the following other effects can be obtained. That is, the porosity of the magnetic film and the underlayer can be adjusted by controlling the proportion of the free poly(alkyleneoxide) to the grafted poly(alkyleneoxide) to be added to the underlayer. For example, even if the thermally decomposable additive is not directly added to the magnetic paint for the magnetic film, the free thermally decomposable additive permeates into the magnetic film from the underlayer to make the magnetic film porous. The micropore formation in the magnetic film by the permeation of the additive contributes to easy formation of continued micropores extending from the underlayer to the magnetic film when the additive is thermally decomposed, because the additive can easily form a phase separation state extending between the underlayer and the magnetic film. The fine pores in the underlayer very effectively work for the impregnation with a lubricant.

BRIEF DESCRIPTION OF THE DRAWINGS

In FIGS. 1 to 4, numeral 1 is a substrate, 2 a magnetic film, 3 magnetic particles, 4 a lubricant, 5 micropores impregnated with a lubricant, 6 non-magnetic particles, 7 micropores impregnated with a lubricant and 8 an underlayer.

DETAILED DESCRIPTION OF THE PREFERRED EMBODIMENTS

The present invention will be described in detail, referring to examples.

The binder and the thermally decomposable additives used in the following Examples and Comparative Examples are given below.

As the binder, a mixed system of epoxy resin, phenol resin and vinyl resin was used, where the epoxy resin was bisphenol A-type, epoxy resin (average molecular weight: about 2,300), the phenol resin was polyvinylphenol (average molecualr weight: about 5,000) or methylolallylphenylether (average molecular weight: about 300) and the vinyl resin was polyvinylbutyral (PVB).

The following thermally decomposable additives were used.

Poly(alkyleneoxide)-grafted epoxy resins were the resin synthesized in the aforementioned procedure, that is, the aforementioned epoxy resin grafted with one molecule of tetramethyleneetherglycol (PTMEG) having an average molecular weight of about 3,000 by use of diphenylmethane-4-4'-diisocyanate, which is represented by the following formula (substance A1) and will be hereinafter referred to as "substance A1":

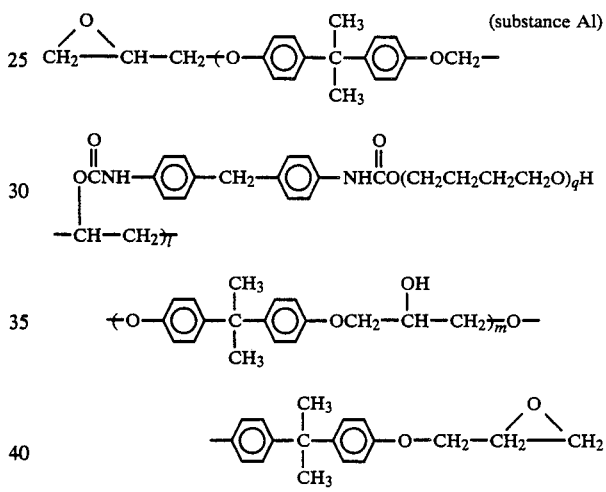

wherein l, m and q are integers and l ≈ 1, and the aforementioned epoxy resin grafted with one molecular of α-(hydro)-ω-(methyloxy)-polybutaneoxide alkyletherized at one end (average molecular weight: about 3,000) by use of 2,4-toluene diisocyanate, which is represented by the following formula (substance A2) and will be hereinafter referred to as "substance A2":

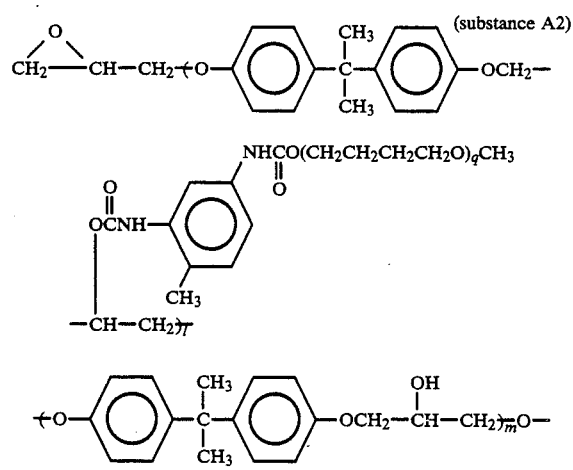

-continued

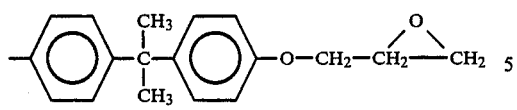

wherein l, m and q are integers and l≈1.

Poly(alkyleneoxide)-grafted phenol resin was the aforementioned polyvinylphenol grafted with two molecules of PTMEG, which is represented by the following formula (substance B) and will be hereinafter referred to as "substance B":

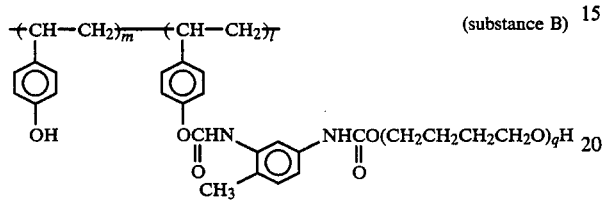

wherein l, m and q are integers and l≈2.

Free thermally decomposable substance, as not grafted on a binder, was the tetramethyleneetherglycol having an average molecular weight of about 3,000 as mentioned above, which is represented by the following formula (substance C) and will be hereinafter referred to as "substance C":

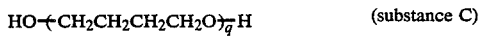    (substance C)

where q is an integer.

Figure 1:
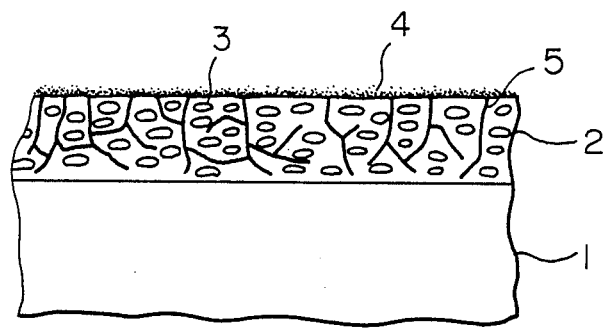
FIG. 1 is a cross-sectional view of the present magnetic recording medium having micropores impregnated with a lubricant.
Figure 2:
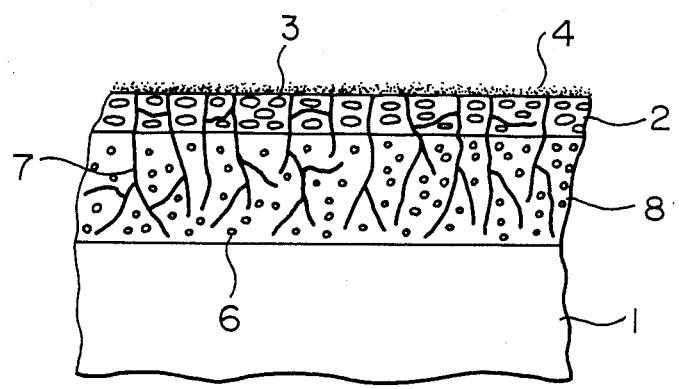
FIG. 2 is a cross-sectional view of the present magnetic recording medium impregnated with a lubricant in the underlayer and magnetic film.
Figure 3:
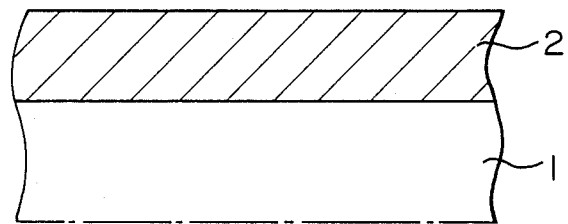
FIG. 3 is a cross-sectional view of a magnetic disk according to Examples 1 to 9 and Comparative Examples 1 to 3 and 5.

An example of a magnetic disk without an underlayer as shown in FIG. 3 will be explained below.

EXAMPLE 1

A magnetic disk was prepared in the following manner.

At first, a magnetic paint was prepared by kneading 600 parts by weight of magnetic powder ({-Fe2O3), 20 parts by weight of a reinforcing agent (α-Al2O3) and 380 parts by weight of sum total of poly(alkylene)-free binders and the binder moiety of poly(alkyleneoxide)-grafted binder, excluding poly(alkyleneoxide) in a solvent mixture of cyclohexanone and isophorone in a kneader and a ball mill, where a mixture of epoxy resin, polyvinylphenol and PVB was in a basic proportion of 50:40:10 by weight and PTMEG-grafted epoxy resin (substance A1) was used as the poly(alkyleneoxide)-grafted binder. In that case, the amount of PTMEG moiety of substance A1 was adjusted to 9.1% by weight on the basis of sum total of PTMEG and the binders in the magnetic paint and the total amount of the epoxy resin moiety of substance A1 and the other epoxy resin was adjusted to be in the aforementioned basic proportion of epoxy resin, polyvinylphenol resin and PVB of 50:40:10 by weight.

Then, the thus prepared magnetic paint was applied to an aluminum alloy substrate by spin coating, and the coating film was dried and finally thoroughly cured. Curing was carried out at a temperature of about 230° C. at which the poly(alkyleneoxide) grafted on the binder could be thermally decomposed. Then, the cured magnetic film was surface-finished to a film thickness of about 0.5 μm and a predetermined amount of a lubricant (Krytox, trademark of perfluoroalkylpolyether, made by DuPont, USA) was applied to the surface of the magnetic disk.

The amount of lubricant retained in the magnetic film and the sliding strength shown in Table 1 were determined in the following manner.

The sticking force between a magnetic head and a magnetic disk was evaluated by a tangential force applied on the magnetic head when the magnetic head was placed on the surface of the magnetic disk and the magnetic disk was made to turn. The sticking force was suddenly increased when the amount of the lubricant exceeded some amount, and this limit amount was deemed to be as an amount of retained lubricant.

The sliding strength was evaluated by making an α-alumina slider (spherical slider with the radius of curvature of 30 mm) slide on the surface of a magnetic disk at a sliding speed of 10 m/sec and counting the number of turns until defects appeared on the surface of the magnetic disk. In that case, a maximum amount of the lubricant was used in such a range as not to increase the sticking force for the evaluation of the sliding strength.

Proportion of polyalkyleneoxide used and amount of retained lubricant and sliding strength as determined in the foregoing manner are given in Table 1.

EXAMPLE 2

A magnetic paint containing an increased amount of PTMEG-grafted epoxy resin (substance A1), as shown in Table 1, was prepared in the same manner as in Example 1 and a magnetic disk was prepared therewith and evaluated in the same manner as in Example 1. The results are given in Table 1.

EXAMPLE 3

A magnetic paint containing PTMEG-grafted polyvinylphenol (substance B) was prepared in the same manner as in Example so that the same amount of poly(alkyleneoxide) as in Example 2 was contained was prepared in the same manner as in Example 1 and a magnetic disk was prepared therewith and evaluated in the same manner as in Example 1. The results are given in Table 1.

EXAMPLE 4

A magnetic paint containing PTMEG-grafted epoxy resin (substance a1) and PTMEG-grafted polyvinylphenol (substance B) was prepared in the same manner as in Example 1 so that PTMEG moieties of substance A1 and substance B were in equal amounts and the same amount of poly(alkyleneoxide) as in Example 2 was contained, and a magnetic disk was prepared therewith and evaluated in the same manner as in Example 1. The results are given in Table 1.

EXAMPLE 5

A magnetic paint containing both PTMEG-grafted epoxy resin (substance Al) and free PTMEG (substance C) was prepared in the same manner as in Example 1 so that PTMEG of both substance A1 and substance C was in equal amounts and the same amount of poly(alkyleneoxide) as in Example 2 was contained, and a magnetic disk was prepared therewith and evaluated in the same manner as in Example 1. The results are given in Table 1.

COMPARATIVE EXAMPLE 1

A magnetic disk was prepared with the same magnetic paint as used in Example 1, except that no thermally decomposable additive PTMEG was contained, and evaluated in the same manner as in Example 1. The results are given in Table 1.

COMPARATIVE EXAMPLE 2

A magnetic paint containing free PTMEG (substance C) was prepared in the same manner as in Example 1, so that the same amount of poly(alkyleneoxide) as in Example 2 was contained, and a magnetic disk was prepared therewith and evaluated in the same manner as in Example 1. The results are given in Table 1.

EXAMPLE 6

A magnetic disk was prepared in the following manner:

At first, a magnetic paint was prepared by kneading 600 parts by weight of magnetic powder ($\text{{-Fe}}_2\text{O}_3$), 20 parts by weight of a reinforcing agent ($\alpha\text{-Al}_2\text{O}_3$) and 380 parts by weight of sum total of the binder and the binder moiety of poly(alkyleneoxide) grafted binder, excluding poly(alkyleneoxide) in a solvent mixture of cyclohexanone and isophorone in a kneader and a ball mill, where a mixture of epoxy resin, methylolallylphenylether and PVB in a basic proportion of 50:40:10 by weight was used as the binder in principle and epoxy resin grafted with PTMEG methyletherized at one terminal (substance A2) was used as the poly(alkyleneoxide) grafted binder. In that case, the amount of PTMEG moiety was adjusted to 10% by weight on the basis of sum total of the PTMEG-free binder and the PTMEG-grafted binder in the magnetic paint.

A magnetic disk was prepared with the thus prepared magnetic paint and evaluated in the same manner as in Example 1. The results are given in Table 2.

EXAMPLE 7

A magnetic disk was prepared and evaluated in the same manner as in Example 6, except that the amount of the epoxy resin grafted with PTMEG methyletherized at one terminal (substance A2) was increased so that the amount of PTMEG in the magnetic paint in the magnetic paint was adjusted to about 20% by weight on the basis as defined in Example 6. The results are given in Table 2.

EXAMPLE 8

A magnetic disk was prepared and evaluated in the same manner as in Example 7 except that polyvinylphenol grafted with PTMEC was used in place of the substance A2 and the amount of PTMEG in the magnetic paint was adjusted to 20% by weight in the same manner as in Example 7. The results are given in Table 2.

EXAMPLE 9

A magnetic disk was prepared and evaluated in the same manner as in Example 6, except that one-half amount of the epoxy resin grafted with PTMEG methyletherized at one terminal (substance A2) was replaced with free PTMEG (substance C) and the amount of PTMEG in the magnetic paint was adjusted to 20% by weight in the same manner as in Examples 7 and 8. The results are given in Table 2.

COMPARATIVE EXAMPLE 3

A magnetic disk was prepared and evaluated in the same manner as in Example 6, except that all of PTMEG was added as free PTMEG (substance C) and the amount of PTMEG was adjusted to 20% by weight in the same manner as in Examples 7, 8 and 9. The results are given in Table 2.

As explained in detail in Tables 1 and 2 and the foregoing Examples, the prepared magnetic disks were so adjusted that the resin compositions were not changed after the thermal decomposition of PTMEG. The magnetic disks prepared by adding a PTMEG-grafted binder or PTMEG to the magnetic paints had a considerably increased amount of a lubricant as impregnated and also had a considerably increased capacity to retain the lubricant. Thus, the sliding strength of the magnetic disks was widely improved. When the surfaces of the thus prepared magnetic disks were inspected with a scanning electron microscope, pores having a pore size of more than 0.1 $\mu$m were observed on the magnetic disks of Comparative Examples 2 and 3, whose noise output was higher during the reproduction than that of the magnetic disk of Comparative Example 1. On the other hand, no pores having a pore size of more than 0.1 $\mu$m were observed substantially at all on the magnetic disks of Examples 1 to 5 and 6 to 9, whose output noise was lower during the reproduction than that of the magnetic disk of Comparative Example 1, to which no thermally decomposable substance was added. The yield was higher in Examples 1 to 5 and 6 to 9 than that of Comparative Examples 2 and 3, and the number of the inferior products of Examples 1 to 5 and 6 to 9 was ¼ to 1/5 of that of Comparative Example 2.

Figure 4:
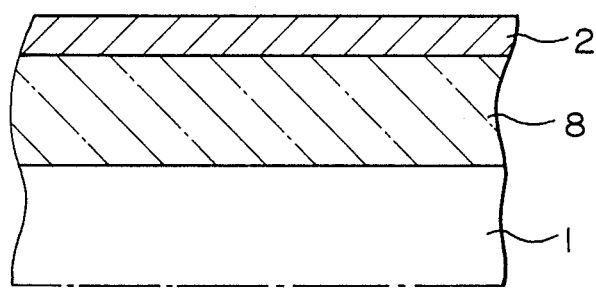
FIG. 4 is a schematic cross-sectional view of a magnetic disk with an underlayer according to Examples 10 and 11 and Comparative Example 4.

Magnetic disks having an underlayer between a magnetic film and a substrate as shown in FIG. 4 will be explained below.

EXAMPLE 10

A magnetic disk was prepared in the following manner.

An underlayer paint was prepared by kneading 570 parts by weight of titanium oxide powder (average particle size: about 40 nm) as non-magnetic powder in place of magnetic powder and 380 parts by weight of sum total of a poly(alkyleneoxide)-free binder and the binder moiety of poly(alkyleneoxide)-grafted binder, excluding poly(alkyleneoxide), in a solvent mixture of cyclohexanone and isophorone in a kneader and a ball mill, where the binder was a mixture of epoxy resin, methylolallylphenylether and PVB in principle and epoxy resin grafted with PTMEG methyletherized at one terminal was used as the poly(alkyleneoxide)-grafted binder. In that case, the amount of PTMEG moiety was adjusted to 30% by weight in the underlayer paint on the basis as defined in Example 1 as to the magnetic paint. The thus prepared underlayer paint was applied to an aluminum substrate by spin coating, dried and cured at such a temperature as not to thermally decompose PTMEG in the underlayer paint substantially at all, that is, 180° C., for 2 hours. Then, the underlayer surface was surface finished to flatten it. Then, a magnetic paint prepared in the same manner as in Example 6, which contained substance A2 so that the amount of PTMEG moiety was 10% by weight, was applied to the underlayer surface and heat-treated at 230° C. for 2 hours to thermally decompose PTMEG in the magnetic film and the underlayer and cure the binders at the same time. Then, the magnetic film was surface-finished. Finally, the underlayer had a thickness of about 1.0 μm and the magnetic film had a thickness of about 0.2 μm. Then, a predetermined amount of a lubricant (perfluoroakylpolyether) was applied to the surface of the magnetic film to prepare a magnetic disk. Then, the thus prepared magnetic disk was evaluated in the same manner as in Example 1. The results are given in Table 3.

EXAMPLE 11

An underlayer was formed on the same substrate as used in Example 10 in the same manner as in Example 10, except that about 20% of the PTMEG moiety of epoxy resin grafted with PTMEG methyletherized at one terminal (substance A2) was replaced with free PTMEG (substance C) in the underlayer paint so that the amount of PTMEG moiety was adjusted to 30% by weight in the same manner as in Example 10.

Then, a magnetic paint was prepared in the same manner as in Example 10 except that no PTMEG was contained at all (the composition of binder was the same as in Example 10). Then, a magnetic disk was prepared in the same manner as in Example 10. The magnetic film had a thickness of 0.3 μm before the surface finishing and 0.2 μm after the surface finishing.

Then, the thus prepared magnetic disk was evaluated in the same manner as in Example 1. The results are shown in Table 3.

COMPARATIVE EXAMPLE 4

A magnetic disk was prepared and evaluated in the same manner as in Example 10, except that all of the poly(alkyleneoxide) moiety was replaced with about 30% by weight of free PTMEG in the underlayer paint. The results are given in Table 3.

COMPARATIVE EXAMPLE 5

A magnetic disk having a magnetic film (thickness: about 0.2 μm) was prepared and evaluated in the same manner as in Example 10, except that no underlayer was provided on the substrate and a magnetic paint prepared in the same manner as in Example 7 was used. The results are given in Table 3.

As is obvious from the results shown in Table 3, the magnetic disks of Examples 10 and 11 and Comparative Example 4 having an underlayer formed from underlayer paints containing a PTMEG-grafted binder or free PTMEG have an considerably increased amount of retained lubricant, as compared with the magnetic disk of Comparative Example 5 with a magnetic film having the same thickness as that of Examples 10and 11 and Comparative Example 4. That is, it can be seen that a large number of pores extending from the underlayer to the surface of the magnetic film are formed and a large amount of the lubricant is retained in the underlayer. This phenomenon shows that, even in the case that no PTMEG is contained in the magnetic paint as in Example 11, PTMEG contained in the underlayer permeates into the magnetic film to form pores also in the magnetic film. As is also obvious from Table 3, the magnetic disks of Examples 10 and 11 and Comparative Example 4 containing a large amount of the lubricant as impregnated as mentioned above have a considerably improved sliding strength owing to the effect of the lubricant as impregnated. However, different from Examples 10 and 11, Comparative Example 4 has a sliding strength which is about ⅓ of that of Examples 10 and 11, though substantially the same amount of the lubricant is retained. As a result of analyses of the magnetic disk of Comparative Example 4, to determine the distribution of the lubricant in the depth direction by a secondary ion mass spectroscopy (SIMS), it has been found that the magnetic film has substantially the same concentration of the lubricant as impregnated as that of the underlayer (addition of about 30% by weight of PTMEG), in spite of addition of about 10% by weight of PTMEG in the formation of the magnetic film. That is, PTMEG contained in the underlayer is much permeated also into the magnetic film and the magnetic film is made more porous than expected. That is, the magnetic film is made excessively porous, and the wear resistance of the magnetic film is lowered and thus it seems that the sliding strength is not so improved as expected. In Examples 10 and 11, poly(alkyleneoxide)-grafted binder is used for making the underlayer porous and thus it seems that the porosity of the magnetic film can be controlled and a satisfactory wear resistance can be obtained.

The magnetic disks of Examples 10 and 11 have a magnetic film with micropores having a pore diameter of not more than 0.1 μm owing to the safe effects as those of the magnetic disks of Examples 1 to 9, and thus have a small output noise during the reproduction.

As explained in detail above, micropores, for example, pores sizes of 0.005 to 0.1 μm, can be formed in a magnetic film by using a binder grafted with a readily thermally decomposable poly(alkyleneoxide) as a binder for a magnetic paint according to the present invention, and thus a high density, magnetic recording medium with less noises and errors during the recording and reproduction can be obtained in a higher yield. Furthermore, the durability of the medium can be improved by formation of a large number of such micropores.

Still furthermore, a magnetic disk of high wear resistance with a sufficiently controlled porosity in the magnetic film and the underlayer can be obtained by using an underlayer paint containing a poly(alkyleneoxide)-grafted binder as mentioned above.

TABLE 1

| Example and Comp. Ex. No. | Binder and additive (parts by weight) | | Poly-(alkyleneoxide) (wt %) | Retention of lubricant (mg/m$^2$) | Sliding strength (k turns) |
|---|---|---|---|---|---|
| Ex. 1 | Epoxy resin | 41.7 | 9.1 | 121 | 21.8 |
|  | Substance A1 | 18.3 |  |  |  |
|  | Polyvinylphenol | 40.0 |  |  |  |
|  | PVB | 10.0 |  |  |  |
| Ex. 2 | Epoxy resin | 33.4 | 16.7 | 225 | 35.6 |
|  | Substance A1 | 36.5 |  |  |  |
|  | Polyvinylphenol | 40.0 |  |  |  |
|  | PVB | 10.0 |  |  |  |
| Ex. 3 | Epoxy resin | 50.0 | 16.7 | 201 | 31.7 |
|  | Polyvinylphenol | 32.3 |  |  |  |
|  | Substance B | 37.7 |  |  |  |

TABLE 1-continued

| Example and Comp. Ex. No. | Binder and additive (parts by weight) | | Poly-(alkyleneoxide) (wt %) | Retention of lubricant (mg/m$^2$) | Sliding strength (k turns) |
|---|---|---|---|---|---|
| Ex. 4 | PVB | 10.0 | 16.7 | 243 | 42.9 |
| | Epoxy resin | 41.7 | | | |
| | Substance A1 | 18.3 | | | |
| | Polyvinylphenol | 21.1 | | | |
| | Substance B | 18.9 | | | |
| Ex. 5 | PVB | 10.0 | 16.7 | 198 | 32.3 |
| | Epoxy resin | 41.7 | | | |
| | Substance A1 | 18.3 | | | |
| | Polyvinylphenol | 40.0 | | | |
| | PVB | 10.0 | | | |
| | Substance C | 10.0 | | | |
| Comp. Ex. 1 | Epoxy resin | 50.0 | — | 52 | 4.8 |
| | Polyvinylphenol | 40.0 | | | |
| | PVB | 10.0 | | | |
| Comp. Ex. 2 | Epoxy resin | 50.0 | 16.7 | 171 | 23.1 |
| | Polyvinylphenol | 40.0 | | | |
| | PVB | 10.0 | | | |
| | Substance C | 16.7 | | | |

TABLE 2

| Example and Comp. Ex. No. | Binder and additive (parts by weight) | | Poly-(alkyleneoxide) (wt %) | Retention of lubricant (mg/m$^2$) | Sliding strength (k turns) |
|---|---|---|---|---|---|
| Ex. 6 | Epoxy resin | 36.7 | 10 | 89 | 19.6 |
| | Substance A2 | 18.3 | | | |
| | Methylolallyl-phenylether | 36.0 | | | |
| | PVB | 9.0 | | | |
| Ex. 7 | Epoxy resin | 23.5 | 20 | 156 | 35.2 |
| | Substance A2 | 36.5 | | | |
| | Methylolallyl-phenylether | 32.0 | | | |
| | PVB | 8.0 | | | |
| Ex. 8 | Epoxy resin | 40.0 | 20 | 142 | 32.1 |
| | Methylolallyl-phenylether | 14.2 | | | |
| | Substance B | 37.8 | | | |
| | PVB | 8.0 | | | |
| Ex. 9 | Epoxy resin | 32.0 | 20 | 163 | 41.6 |
| | Substance A2 | 18.2 | | | |
| | Methylolallyl-phenylether | 32.0 | | | |
| | PVB | 8.0 | | | |
| | Substance B | 10.0 | | | |
| Comp. Ex. 3 | Epoxy resin | 40.0 | 20 | 148 | 34.9 |
| | Methylolallyl-phenylether | 32.0 | | | |
| | PVB | 8.0 | | | |
| | Substance C | 20.0 | | | |

TABLE 3

| Example and Comp. Ex. No. | Binder and additive (parts by weight) | | Poly-(alkyleneoxide) (wt %) | Retention of lubricant (mg/m$^2$) | Sliding strength (k turns) |
|---|---|---|---|---|---|
| Ex. 10 | Magnetic Film (thickness 0.2 μm) | | | 487 | 235.9 |
| | Epoxy Resin | 36.7 | 10 | | |
| | Substance A2 | 18.3 | (Magnetic film) | | |
| | Methylolallyl-phenoylether | 36.0 | | | |
| | PVB | 9.0 | | | |
| | Underlayer (thickness 1.0 μm) | | | | |
| | Epoxy resin | 10.3 | 30 | | |
| | Substance A2 | 54.7 | (Underlayer) | | |
| | Methylolallyl-phenoylether | 28.0 | | | |
| | PVB | 7.0 | | | |
| Ex. 11 | Magnetic film (thickness 0.2 μm) | | | 452 | 221.2 |
| | Epoxy resin | 50.0 | 0 | | |
| | Methylolallyl-phenoylether | 40.0 | (Magnetic film) | | |

TABLE 3-continued

| Example and Comp. Ex. No. | Binder and additive (parts by weight) | | Poly-(alkyleneoxide) (wt %) | Retention of lubricant (mg/m²) | Sliding strength (k turns) |
|---|---|---|---|---|---|
| | PVB Underlayer (thickness 1.0 μm) | 10.0 | | | |
| | Epoxy resin | 15.1 | 30 (Underlayer) | | |
| | Substance A2 | 43.9 | | | |
| | Methylolallyl-phenoylether | 28.0 | | | |
| | PVB | 7.0 | | | |
| | Substance C | 6.0 | | | |
| Comp. Ex. 4 | Magnetic film (thickness 0.2 μm) | | | | |
| | Epoxy resin | 36.7 | 10 (Magnetic film) | 501 | 25.7 |
| | Substance A2 | 18.3 | | | |
| | Methylolallyl-phenoylether | 36.0 | | | |
| | PVB | 9.0 | | | |
| | Underlayer (thickness 1.0 μm) | | | | |
| | Epoxy resin | 35.0 | 30 (Underlayer) | | |
| | Methylolallyl-phenoylether | 28.0 | | | |
| | PVB | 7.0 | | | |
| | Substance C | 30.0 | | | |
| Comp. Ex. 5 | Magnetic film (thickness 0.2 μm) | | | | |
| | Epoxy resin | 23.5 | 20 (Magnetic film) | 68 | 14.7 |
| | Substance A2 | 36.5 | | | |
| | Methylolallyl-phenoylether | 32.0 | | | |
| | PVB | 8.0 | | | |

What is claimed is:

1. A process for producing a magnetic recording medium which comprises applying a magnetic paint containing at least magnetic particles and a thermally curable binder to a substrate, thermally curing the applied magnetic paint, thereby forming a magnetic film, and impregnating micropores formed in the magnetic film with a lubricant, the magnetic paint further containing a poly(alkyleneoxide)-grafted binder, the grafted poly(alkyleneoxide) moiety being thermally decomposed during the thermal curing, thereby forming the micropores in the magnetic film.

2. A process according to claim 1, wherein the poly(alkyleneoxide) is poly(alkyleneoxide) having a hydroxyl group at least at one terminal.

3. A process according to claim 1, wherein the magnetic paint further contains polyalkyleneoxide in an amount not more than 4 times the weight of the grafted poly(alkyleneoxide) moiety.

4. A magnetic disk prepared according to a process of claim 3.

5. A magnetic disk prepared according to a process of claim 2.

6. A process according to claim 1, wherein the poly(alkyleneoxide) is poly(alkyleneoxide) having an alkylether group at least at one terminal.

7. A process according to claim 6, wherein the magnetic paint further contains polyalkyleneoxide in an amount not more than 4 times the weight of the grafted poly(alkyleneoxide) moiety.

8. A magnetic disk prepared according to a process of claim 6.

9. A magnetic disk prepared according to a process of claim 1.

10. A magnetic disk according to claim 9, wherein micropores in the magnetic film have a pore size of not more than 0.1 μm and a total pore area of 3 to 30%.

11. A magnetic paint, which comprises at least magnetic particles and a thermally curable binder, a portion of the thermally curable binder being a poly(alkyleneoxide)-grafted thermally curable binder.

12. A magnetic paint according to claim 11, wherein the thermally curable binder is a mixture of epoxy resin, phenol resin and vinyl resin, at least a portion of at least one of the resins is a resin grafted with the poly(alkyleneoxide).

13. A magnetic paint according to claim 12, wherein the poly(alkyleneoxide) is poly(alkyleneoxide) having a hydroxyl group at least at one terminal.

14. A magnetic paint according to claim 12, wherein the poly(alkyleneoxide) is poly(alkyleneoxide) having an alkylether group at least at one terminal.

15. A magnetic paint according to claim 12, wherein the magnetic paint further contains poly(alkyleneoxide) in an amount of not more than 4 times the weight of the grafted poly(alkyleneoxide) moiety.

16. A magnetic paint according to claim 11, wherein the poly(alkyleneoxide) is poly(alkyleneoxide) having a hydroxyl group at least at one terminal.

17. A magnetic paint according to claim 16, wherein the magnetic paint further contains poly(alkyleneoxide) in an amount of not more than 4 times the weight of the grafted poly(alkyleneoxide) moiety.

18. A magnetic paint according to claim 11, wherein the poly(alkyleneoxide) is poly(alkyleneoxide) having an alkylether group at least at one terminal.

19. A magnetic paint according to claim 18, wherein the magnetic paint further contains poly(alkyleneoxide) in an amount of not more than 4 times the weight of the grafted poly(alkyleneoxide) moiety.

20. A magnetic paint according to claim 11, wherein the magnetic paint further contains poly(alkyleneoxide) in an amount of not more than 4 times the weight of the grafted poly(alkyleneoxide) moiety.

21. A process for producing a magnetic recording medium, which comprises applying a paint containing a thermally curable binder and a poly(alkyleneoxide)-grafted binder as a portion of the binder to a substrate, thereby forming an underlayer, subjecting the underlayer to primary curing at a temperature at which the poly(alkyleneoxide) can remain in the underlayer, then applying a magnetic paint containing at least magnetic particles and a thermally curable binder to the underlayer, thereby forming a magnetic film, subjecting the magnetic film and the underlayer to a secondary curing at a higher temperature than the temperature for the primary curing, thereby thermally decomposing the poly(alkyleneoxide) moiety in the underlayer and dissipating the decomposition products, thereby forming a large number of fine pores in the underlayer and forming micropores extending from the fine pores to the surface of the magnetic film at the same time, and impregnating fine pores with a lubricant from the micropores.

22. A process according to claim 21, wherein the poly(alkyleneoxide) is poly(alkyleneoxide) having a hydroxyl group at least at one terminal.

23. A magnetic disk prepared according to a process of claim 22.

24. A process according to claim 21, wherein the poly(alkyleneoxide) is poly(alkyleneoxide) having an alkylether at least at one terminal.

25. A magnetic disk prepared according to a process of claim 24.

26. A magnetic disk prepared according to a process of claim 21.

* * * * *